United States Patent [19]

Williams

[11] 4,255,057

[45] Mar. 10, 1981

[54] METHOD FOR DETERMINING QUALITY OF U.S. CURRENCY

[75] Inventor: Charles J. Williams, Carmel, N.Y.

[73] Assignee: The Perkin-Elmer Corporation, Norwalk, Conn.

[21] Appl. No.: 81,752

[22] Filed: Oct. 4, 1979

[51] Int. Cl.³ .................... G01N 21/01; G01N 21/89; B65H 7/12

[52] U.S. Cl. .................................. 356/435; 209/534; 250/559; 271/263

[58] Field of Search ........................ 356/430, 432-435, 356/445, 448; 250/559; 209/534

[56] References Cited

U.S. PATENT DOCUMENTS

| | | | |
|---|---|---|---|
| 3,496,370 | 2/1970 | Haville | 209/534 |
| 3,827,808 | 8/1974 | Cho | 356/429 |
| 3,976,198 | 8/1976 | Carnes, Jr. et al. | 250/223 R |

FOREIGN PATENT DOCUMENTS

| | | | |
|---|---|---|---|
| 2310882 | 10/1973 | Fed. Rep. of Germany | 209/534 |

*Primary Examiner*—Conrad J. Clark
*Assistant Examiner*—Bruce Y. Arnold
*Attorney, Agent, or Firm*—Salvatore A. Giarratana; Edwin T. Grimes; Thomas P. Murphy

[57] ABSTRACT

An apparatus for detecting quality of currency or the like. Signals representative of the transmissivity and reflectivity of a bill are subtracted from a signal representative of unity. The resulting signal, which is representative of absorptivity of light by the bill, is accumulated over the length of the bill and compared to a reference to produce digital signals representative of fit or unfit bills.

17 Claims, 2 Drawing Figures

METHOD FOR DETERMINING QUALITY OF U.S. CURRENCY

BACKGROUND OF THE INVENTION

Currency, and other negotiable paper which are in circulation eventually becomes so worn as to be unfit for continued use. The U.S. Treasury Department daily removes from circulation millions of dollars which have deteriorated in quality below acceptable standards. Until recently all of this inspection was done by human inspectors who visually examine each bill and make a determination of whether a bill is fit or unfit for further circulation. While these individuals are highly skilled, such a routine function is slow, inefficient, wasteful of human resources and subject to non-uniformity in the judgment standards among different individuals.

Various techniques have been devised for processing automatically both uncirculated and circulated currency. Systems for processing uncirculated currency are primarily for the purpose of detecting flawed bills which are then prevented from entering circulation.

Systems for processing circulated currency primarily check for such things as quality, genuineness, and denomination. Both systems may employ automatic sorting arrangements.

The amount of dirt on a bill is an excellent measure of its quality since general wear, wrinkles, limpness, etc. are all closely related to the amount of dirt that has accumulated on the bill during its circulation. Thus, quality of a bill may be determined by measuring the dirt it has picked up.

One method of making such a measurement is by detecting and converting to a signal the amount of light transmitted through the bill and comparing the signal to a reference signal representative of a bill of acceptable quality. One such system is described broadly in U.S. Pat. No. 3,976,198 entitled "Method and Apparatus for Supporting Currency". The method therein disclosed measures transmissivity of light through the bill over its length during transit through an inspection station. The total amount of light transmitted through the bill is averaged or integrated to produce a signal representative of total transmissivity of the bill. This signal is compared to a known standard for determination of fitness or unfitness of the bill. Systems such as the above described patented system which rely on transmissivity alone for a quality check are prone to errors caused by circuit variations and variations in light intensity, such as, transient changes in intensity due to light source voltage variations as well as degradation of intensity in light emission over the lifetime of the light source.

The present invention relates to an apparatus for measuring quality of currency which compensates for errors due to light source and circuit variations.

SUMMARY OF INVENTION

The present invention contemplates a system for determining the quality of currency by measuring the average absorptivity of light by a bill over its length which compensates for errors due to variations in light source intensity and detector and amplifier gain errors by normalizing the absorption measurment to the incident light level. The present invention utilizes the fact that a soiled note absorbs an amount of incident light which is proportional to the amount of soil on the bill as well as the fact that the light energy incident on a bill is equal to the light reflected from the bill plus the light transmitted through the bill plus the light absorbed by the bill.

Specifically the invention contemplates an inspection station through which a test bill passes. The inspection station includes means for measuring the amount of light transmitted through the bill and the amount of light reflected from the bill. These values are converted to voltages and divided by a voltage representative of the intensity of the light source. Each voltage is then subtracted from the voltage representative of the light intensity divided by itself to give a voltage representative of absorptivity of light by the bill. This voltage representative of absorbtivity is accumulated over the length of the bill and compared to a preselected voltage representative of an acceptable quality to provide signals indicative of fitness or unfitness of the bill. The present invention is also useful in detecting doubles i.e. two bills together since in such a case absorptivity is increased substantially beyond that of a single bill of acceptable quality.

DESCRIPTION

Figure 1:
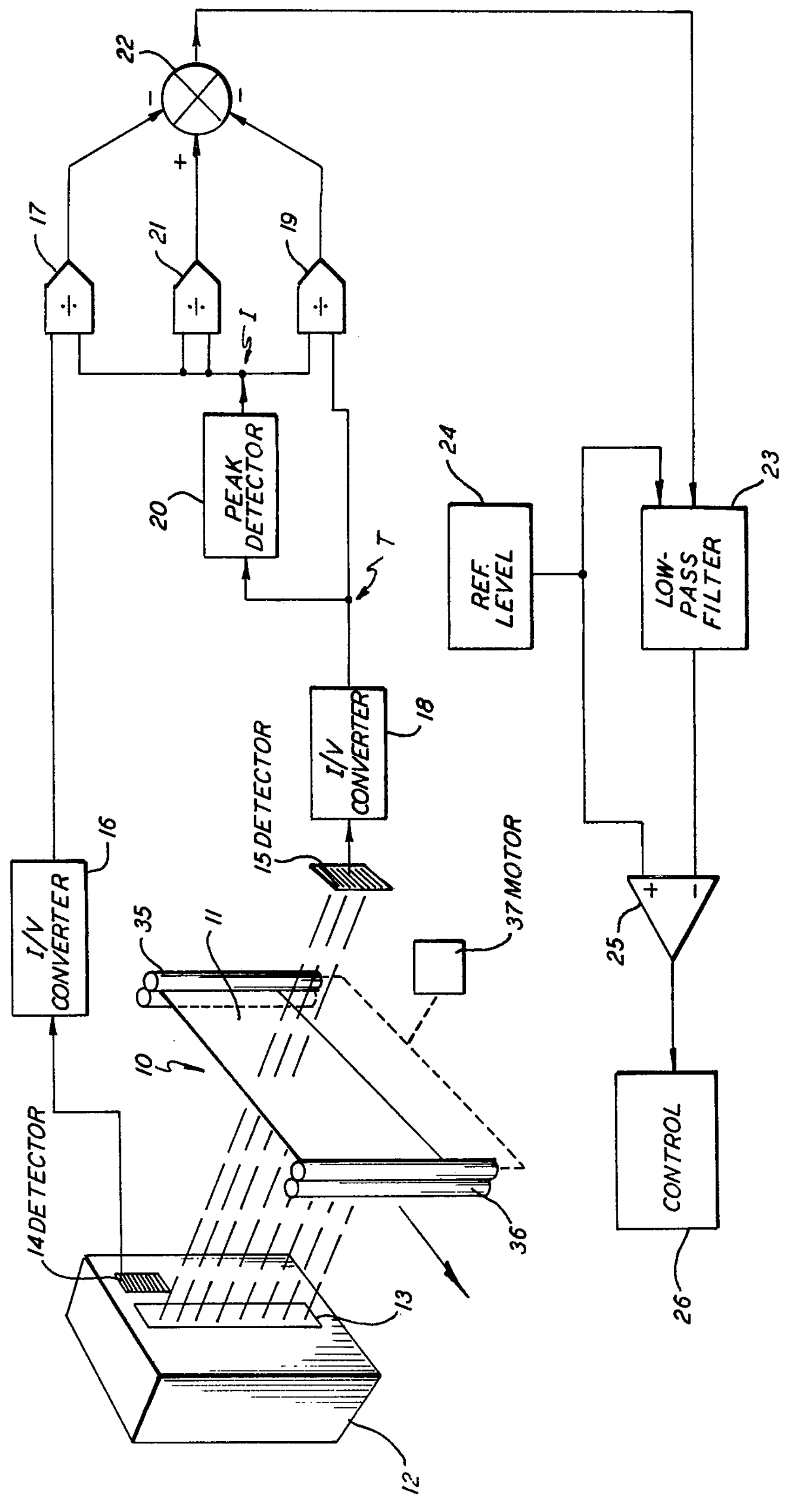
FIG. 1 illustrates in block diagram form a preferred embodiment of the present invention.

Referring now more particularly to FIG. 1 there is shown an inspection station 10 through which test bills or notes are serially passed. A test bill 11 is shown being transported by roller sets 35 and 36 through the inspection station 10 in the direction shown. Individual bills similar to bill 11 are transported through the inspection station one at a time in a serial fashion by roller sets 35 and 36 driven by appropriate motor means 37 shown schmatically connected to the roller sets 35 and 36. The roller sets 35 and 36 may be fixed in position within inspection station 10 by any convenient means.

The inspection station 10 further comprises a panel 12 having incorporated therein a light source 13 and a reflection sensor 14. The light source 13 is elongated so as to bathe the entire width of the bill 11 with light and hence the complete surface of the bill as it passes through the inspection station 10. The inspection station 10 also comprises a transmission sensor 15 disposed on the side of bill 11 opposite that of panel 12 such that the light transmitted through the bill 11 is sensed by the transmission sensor 15. In a similar manner a light reflected from the surface of the bill exposed to the light source 13 is sensed by the reflection sensor 14.

The reflection sensor 14 provides a current proportional to the amount of light reflected from the surface of the bill 11 which is converted to a voltage by current to voltage converter 16 to produce a signal proportional to the reflection of light from the bill under test. This signal is applied as one input to a divider 17. Similarly, the transmission sensor 15 provides a current proportional to the amount of light transmitted through the bill 11 which is converted by current to voltage converter 18 into a voltage proportional to transmission of light through the test bill. This signal is applied as one input to divider circuit 19.

The output of converter 18 is also connected to peak detector 20 whose output provides the second input to each of divider circuits 17 and 19. The peak detector 20 also provides its output as the two inputs to a divider circuit 21 assuring that the output of divider 21 is always unity. The output of the peak detector 20 is a voltage proportional to the total intensity of the light source 13 obtained when the light source 13 is shining directly on the transmission sensor 15 without a bill intervening for example, as occurs during the space between bills. The peak detector may comprise a capacitor in series with a diode which permits the capacitor to charge only when the input voltage is higher than the charge on the capacitor.

The outputs from the divider circuits 17, 19 and 21 are provided as inputs to a summing circuit 22 which subtracts the sum of the outputs from divider circuits 17 and 19 from the output of divider circuit 21 which is always one. The output from divider circuit 17 is the reflectivity divided by peak intensity of the light source 13 while the output from the divider circuit 19 is transmissivity divided by the peak intensity of the light source 13. This causes each of the outputs from dividers 17 and 18 to have normalized values between 0 and 1 and hence independent of light source intensity variations.

The summing circuit 22 provides an output signal proportional to the amount of light absorbed by the test note as given by the equation:

$$A/I=(1-R/I+T/I)$$

where:

A/I = absorbtivity
R = reflectivity
T = transmissivity
I = incident intensity of the light source.

As may be seen the output of the summing circuit 22 which is absorbtivity is normalized and, therefore varies as the soiled condition of the test bill varies but is independent of such circuit anomalies as light source intensity variation, detector responsivity errors and converter gain variations.

The output of the summing circuit 22 is provided as an input to low pass filter 23. Low pass filter 23 has a second input from reference level generator 24 which provides a voltage representative of acceptable quality of the bill. The output from the reference level generator 24 is DC and may in practice be provided by means of a potentiometer connected to a DC source and set to a desired quality level. The output of the reference level generator 24 is also connected to the plus side of an operational amplifier 25 while the output of the low pass filter 23 is connected to the negative side of the operational amplifier 25. While the function of the low pass amplifier 23 is more fully explained hereinbelow with reference to FIG. 2, it should be noted that low pass filter 23 eliminates the AC component of the absorbtivity signal from the summing circuit 22 and produces an output proportional to the average DC value of that signal, that is, the average absorbtivity. By means of the reference level generator 24 the output of the low pass filter 23 is initially preset to the quality reference level provided by the reference level generator 24 so that the output of the low pass filter 23 either charges or discharges from the reference level depending on whether the quality of the bill under test exceeds or is below acceptable quality level as set by the reference level generator 24. The operational amplifier 25 compares the output of the filter 23 to the quality reference level voltage and provides a digital logic signal indicative of the quality of the test bill. For example, a logic "1" indicates that the test bill is unfit for further circulation and a logic "0" indicates that the quality of the test bill exceeds the acceptable reference level.

The output of the operational amplifier 25 may be utilized to provided a simple indication of fit and unfit bills and may also be used in association with control means 26 to direct unfit bills to a special repository for later destruction while permitting the test bills which pass the quality test to be appropriately directed to a repository of bills destined for recirculation.

Figure 2:
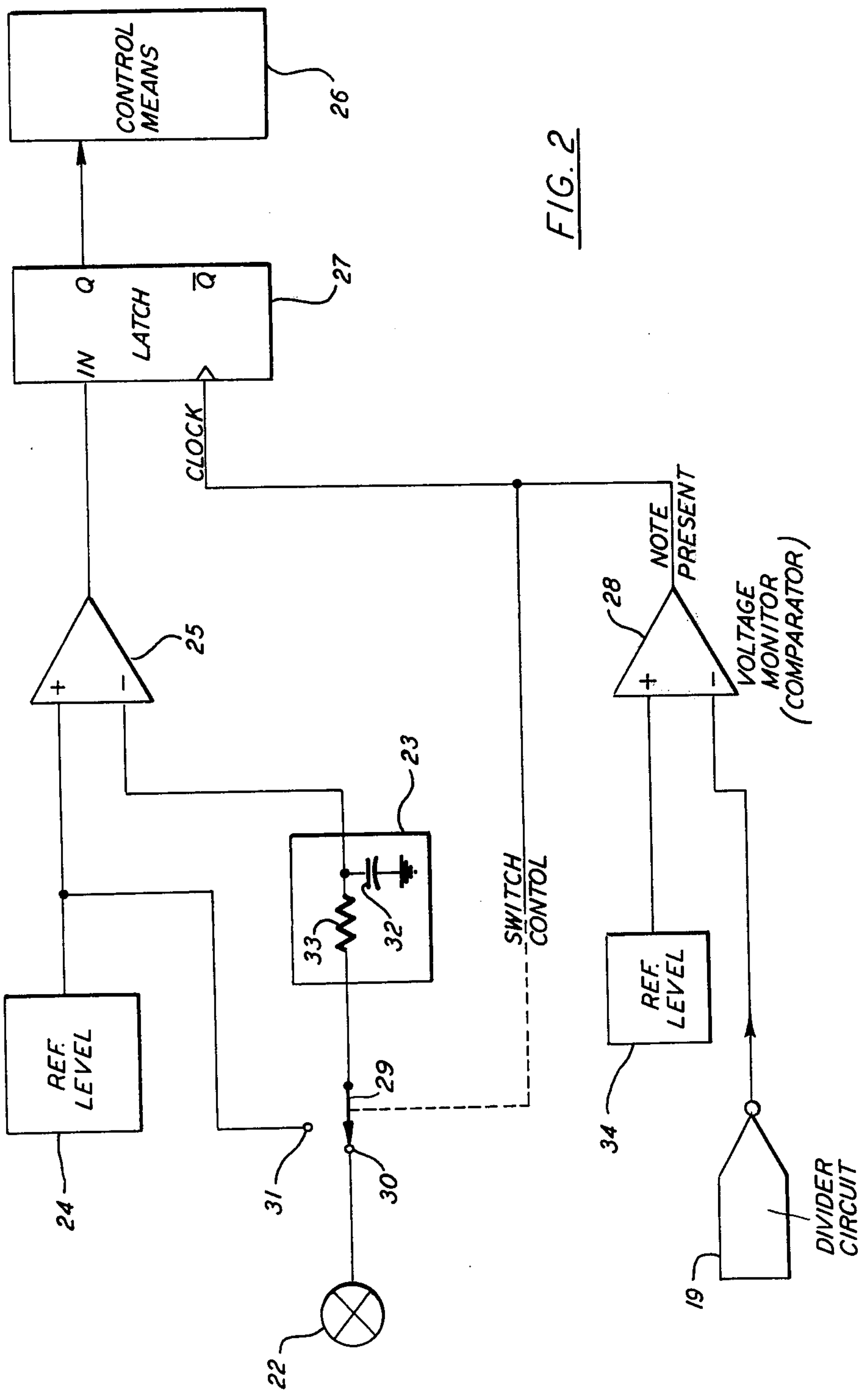
FIG. 2 is a more detailed representation of the output portion of FIG. 1.

FIG. 2 illustrates additional details of the output portion of the circuit of FIG. 1. Low pass filter 23 comprises a capacitor 32 having one end connected to ground. A resistance 33 has one end connected to the other end of the capacitor 32 and to the negative side of operational amplifier 25. The other end of resistance 32 is connected to summing circuit 22 via switch 29 and terminal 30. The output of reference level generator 24 which as indicated above is connected to the plus side of operational amplifier is also connected to terminal 31.

In a practical embodiment the output of operational amplifier 25 is connected to control means 26 via a latch circuit 27. The output terminal of an operational amplifier 28 is also connected to the latch circuit 27.

The divider circuit 19 has its output connected to the negative side of operational amplifier 28. The positive side of operational amplifier 28 is connected to voltage reference level generator 34.

In a practical embodiment switch 29 is an electronic switch of the CMOS bilateral type available from RCA under the CD 4016A series.

The operational amplifier 28 which functions as a voltage monitor has its output terminal also connected to electronic switch for the control thereof.

When the output from divider circuit 19, which is representative of transmissivity, falls below the voltage of reference level generator 29 which has been set at a voltage indicative of a bill being present between light source 13 and transmission sensor 15, the operational amplifier 28 provides a logic "1" output. This causes electronic switch 29 to connect summing circuit 22 to a resistance 33 which may be schematically represented by connecting switch 29 to terminal 30. When the output from divider circuit 19 is above the reference voltage from reference voltage generator 34 indicative that no bill is present operational amplifier 28 produces a logic "0" output which connects resistance 33 to reference voltage generator 24.

Thus, during the time that no bill is between light source 13 and the transmission sensor 15, switch 29 is in contact with terminal 31 which connects reference level generator to capacitor 27 causing capacitor 27 to be charged to the reference voltage level.

On the other hand when a bill is moved between light source 13 and transmission sensor 15, switch 29 is switched to the position shown in contact with terminal 30 connecting the output from summing circuit to the capacitor 27. This causes the capacitor 27 to charge if the absorptivity signal is greater than the reference level voltage and to discharge if the absorptivity signal is less than the reference level voltage. At the end of the interval during which a bill is present the voltage on capacitor 27 is compared to the reference level voltage in operational amplifier 25. The operational amplifier is connected to provide a logic "0" if the bill is fit i.e. average absorptivity is below the reference level or a logic "1" if the bill is unfit i.e. average absorptivity is above the reference level.

The latch circuit 27 which has inputs from the operational amplifiers 25 and 28 maintains its output except during transition of the output from operational amplifier 28 from a logic "1" to a logic "0". Thus, the output of the latch circuit 27 changes states only at the end of a bill interval when the output of the voltage monitoring operational amplifier 28 returns to the logic "0" state. When this occurs, the output of operational amplifier 25 is latched and held until the end of the next bill at which time it is again sampled. Thus, the output from the operational amplifier 25 indicative of a fit or unfit bill is sampled at the end of each bill via latch circuit 27 to provide a clear indication to control circuit 26 of the quality of each bill tested. The "0" or "1" indication of fit or unfit bills is held by the latch circuit 27 until the end of the next bill.

It is unnecessary that the capacitor 27 be charged fully to the average absorptivity of the test bill. It need only charge above or discharge below the reference level voltage sufficiently to allow operational amplifier 25 to discriminate the sense of the charge or discharge.

Thus, in operation the present invention determines acceptability of each bill transported through the inspection station. In addition the presence of two or more notes being transported together are also detected.

Other modifications of the present invention are possible in light of the above description which should not be construed as limiting the invention beyond those limitations set forth in the claims which follow:

What is claimed is:

1. An apparatus for determining absorptivity of a bill, comprising:
- a light source directing light onto a surface of the bill;
- first means for sensing light reflected from said surface and providing an output voltage proportional to the reflection of light from the bill;
- second means for sensing light transmitted through the bill and providing an output voltage proportional to the transmission of light through the bill;
- third means, connected to said first and second means, for providing an output voltage proportional to the absorptivity of the bill independent of variations in light source intensity.

2. An apparatus according to claim 1 wherein said third means comprises:
- detector means for providing an output voltage proportional to the intensity of said light source;
- first circuit means for dividing each of the output voltages from said first and second means by the output voltage from said detector means and for subtracting the sum of the divided voltages from one.

3. An apparatus according to claim 2 wherein said first circuit means comprises:
- first divider means, connected to said first means and said detector means, for dividing the output voltage from said first means by the output voltage from said detector means;
- second divider means, connected to said second means and said detector means for dividing the output voltage from said second means by the output voltage from said detector means;
- second circuit means for providing an output voltage of unity;
- means for subtracting the sum of the output voltages from said first and second divider means from the output voltage from said second circuit means.

4. An apparatus according to claim 3 wherein said first means comprises:
- first light sensor means, disposed to receive light reflected from the bill, for providing an output current proportional to the intensity of the light reflected from the bill;
- first current to voltage converter means, connected to said first light sensor means, for providing an output voltage proportional to the intensity of the light reflected from the bill.

5. An apparatus according to claim 4 wherein said second means comprises:
- second light sensor means, disposed to receive light transmitted through the bill, for providing an output current proportional to the intensity of the light transmitted through the bill;
- second current to voltage converter means, connected to said second light sensor means, for providing an output voltage proportional to the intensity of the light received by said second light sensor means.

6. An apparatus for determining quality of a bill, comprising:
- a light source;
- first means for transporting bills past said light source;
- first light sensor means, disposed to receive light reflected from a surface of a bill for providing an output voltage proportional to the intensity of the light reflected from the bill;
- second light sensor means, disposed to receive light transmitted through a bill, for providing an output voltage proportional to the intensity of the light received by said second light sensor means;
- second means, connected to said first and second light sensor means, for providing an output voltage proportional to the absorptivity of the bill independent of variations in light source intensity;
- third means, connected to said second means for providing a first signal when said absorptivity averaged over the length of the bill is above a predetermined amount and a second signal when said absorptivity, averaged over the length of the bill, is below said predetermined amount.

7. An apparatus according to claim 6 wherein said second means comprises:
- detector means for providing an output voltage proportional to the intensity of said light source;
- first circuit means for dividing each of the output voltages from said first and second light sensor means by the output voltage from said detector means and for subtracting the sum of the divided voltages from one.

8. An apparatus according to claim 7 wherein said first circuit means comprises:
- first divider means, connected to said first light sensor means and said detector means, for dividing the output voltage from said first light sensor means by the output voltage from said detector means;
- second divider means, connected to said second light sensor means and said detector means, for dividing the output voltage from said second light sensor means by the output voltage from said detector means;
- second circuit means for providing an output voltage of unity;

means for subtracting the sum of the output voltages from said first and second divider means from the output voltage from said second circuit means.

9. An apparatus according to claim 8 wherein said first light sensor means comprises:

a first light sensor, disposed to receive light reflected from the bill, for providing an output current proportional to the intensity of the light reflected from the bill;

first current to voltage converter means, connected to said first light sensor, for providing an output voltage proportional to intensity of the light reflected from the bill.

10. An apparatus according to claim 9 wherein said second light sensor means comprises:

a second light sensor, disposed to receive light transmitted through the bill, for providing an output current proportional to the intensity of the light received by said second light sensor;

second current to voltage converter means, connected to said second light sensor, for providing an output voltage proportional to the intensity of the light received by said second light sensor.

11. An apparatus according to claim 6 wherein said third means comprises:

averaging circuit means, connected to said summing means, for averaging said output voltage proportional to absorptivity over the length of a bill;

reference voltage generator means, connected to said averaging circuit means, for providing an output reference voltage;

comparator circuit means, connected to said averaging circuit means and said reference voltage generator means, for providing a first output when said output voltage proportional to average absorptivity exceeds said reference voltage and a second output when said output voltage proportional to average absorptivity is less than said reference voltage.

12. An apparatus according to claim 11 wherein said averaging circuit means comprises:

a capacitor;

switch means, normally closed, connecting said capacitor to said summing means and to said reference voltage generator when no bill is disposed between said light source and said second light sensor means.

13. An apparatus according to claim 12 wherein said comparator circuit means comprises:

an operational amplifier, having one input connected to said capacitor and a second input connected to said reference voltage generator means, for providing a first signal when said absorbtivity averaged over the length of the bill is above a predetermined amount and a second signal when said absorptivity averaged over the length of the bill is below said predetermined amount.

14. An apparatus according to claim 13 wherein said second means comprises:

detector means for providing an output voltage proportional to the intensity of said light source;

first circuit means for dividing each of the output voltages from said first and second light sensor means by the output voltage from said detector means and for subtracting the sum of the divided voltages from one.

15. An apparatus according to claim 14 wherein said first circuit means comprises:

first divider means, connected to said first light sensor means and said detector means, for dividing the output voltage from said first light sensor means by the output voltage from said detector means;

second divider means, connected to said second light sensor means and said detector means, for dividing the output voltage from said second light sensor means by the output voltage from said detector means;

second circuit means for providing an output voltage of unity;

means for subtracting the sum of the output voltages from said first and second divider means from the output voltage from said second circuit means.

16. An apparatus according to claim 15 wherein said first light sensor means comprises:

a first light sensor, disposed to receive light reflected from the bill, for providing an output current proportional to the intensity of the light reflected from the bill;

first current to voltage converter means, connected to said first light sensor, for providing an output voltage proportional to the intensity of the light reflected from the bill.

17. An apparatus according to claim 16 wherein said second light sensor means comprises:

a second light sensor, disposed to receive light transmitted through the bill, for providing an output current proportional to the intensity of the light received by said second light sensor;

second current to voltage converter means, connected to said second light sensor, for providing an output voltage proportional to the intensity of the light received by said second light sensor.

* * * * *